Oct. 6, 1936. H. SWEET 2,056,304
FIBER CONDUIT INSTALLATION
Filed Nov. 5, 1935
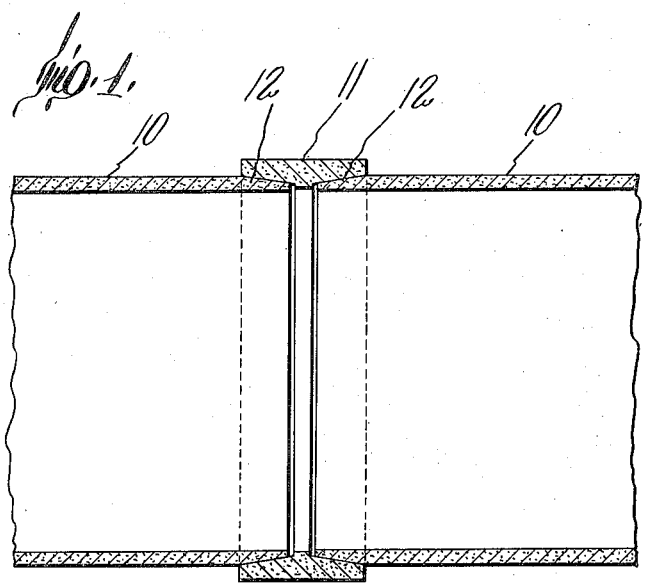
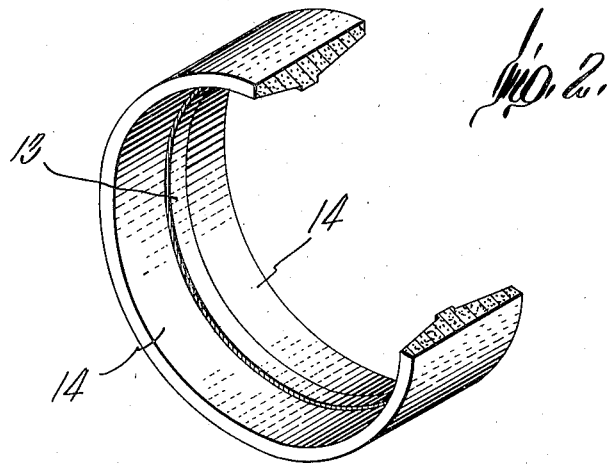
Inventor
Harry Sweet
by Wright, Brown, Quinby & May
Attys Patented Oct. 6, 1936

2,056,304

UNITED STATES PATENT OFFICE 2,056,304

FIBER CONDUIT INSTALLATION

Harry Sweet, Berlin, N. H., assignor to Brown Company, Berlin, N. H., a corporation of Maine Application November 5, 1935, Serial No. 48,333

2 Claims. (Cl. 285—193)

The subject of this invention is fiber conduit installation such as sometimes serves the purpose of housing subterranean electric-wiring systems, for instance, telephone-wiring systems. The fiber conduit contemplated herein is manufactured in short lengths or sections which are joined end-to-end by couplings as they are being installed in the ground.

An objective of the present invention is to enable a tight and leakproof coupling of fiber conduit sections whose walls are relatively thin and do not lend themselves to fashioning for end-joining as heretofore accomplished. Another objective is to enable the coupling of thin-walled fiber conduit sections with minimum effort and with assurance that the installed conduit will not leak. Still another objective is to realize the desired conduit installation with minimum expense in fashioning the conduit sections and/or the coupling itself.

The conduit sections and the coupling employed in the installation of the present invention are fiber-walled and are impregnated with waterproofing binder lending good machinability thereto. Each section may be made by a well-known practice which involves convoluting a wet web of interfelted cellulose fibers onto a mandrel into a tube of the desired wall thickness, removing the tube from the mandrel, drying it, and impregnating it with the appropriate binder, preferably molten pitch or similar bituminous binder. The coupling used in the installation of the present invention may be fashioned from short pieces or collars of similar tubular stock, but the tubular stock for forming the coupling is preferably of a wall thickness distinctly greater than that of the conduit sections to be united thereby.

The installation of the present invention will now be described in detail with reference to the accompanying drawing wherein,—

Fig. 1 represents a section through the coupled end portions of a pair of installed conduit sections.

Fig. 2 shows in perspective a coupling collar, part of which has been broken away to reveal the internal collar wall.

As shown in Fig. 1, the pair of conduit sections joined in accordance with the present invention are relatively thin-walled. By virtue of the thinness of their walls and their waterproofed fiber structure, they are somewhat fragile, but they are quite hard and lend themselves nicely to machining. The coupling collar 11, with which the adjacent end portions 12 of the conduit sections are in tight frictional engagement, is composed of material similar to the conduit sections; and it is formed from a tubular piece of distinctly greater original wall thickness than the conduit sections.

In fashioning the coupling collar, the internal wall of a piece or collar of waterproofed fiber tubing of the appropriate length and wall thickness is machined or cut, as on a lathe, to provide thereon an annular rib 13 substantially midway thereof and wall portions 14 immediately beyond the rib each of progressively and slightly increasing internal diameter toward the end of the piece. The end portion 12 of each conduit section is also machined or cut so that its external diameter progressively and slightly decreases toward its end. The taper or progressively decreasing external diameter thus produced at each end portion 12 is made to correspond exactly to, or be of minutely less angularity or taper than, the progressively increasing internal diameter of the coupling wall portion 14, wherefore, each end portion 12 of a conduit section may be driven into a coupling wall portion 14 and, under the radial forces set up during driving, yield a dry, exceedingly tight fit that prevents leakage of water into the conduit. The annular rib 13 on the internal wall of the coupling acts to prevent either end portion 12 from being overdriven and thus causing a loose or open joint at the coupling ends into which moisture would be apt to leak and thence work its way into the interior of the conduit and impair the electric-wiring system therein. It is desirable that the surface of the rib 13 in the coupling extend, as shown, slightly below or outwardly of the internal faces or walls of the conduit sections 10. This is desirable in that it obviates the possibility of an electric cable catching on the rib in being dragged through the installed conduit, as is usually done in this art. Of course, the surface of the rib might for the same reason be substantially flush with the internal surfaces or walls of the conduit sections.

The installation of the present invention is particularly advantageous when the waterproofed fiber conduit sections are of a wall thickness of less than 0.25", say, 0.18 to 0.25", as at such low wall thickness it is extremely difficult, if not impossible, to use the standard so-called Harrington joint which involves tapering the end portions of conduit sections while developing a shoulder at the large end of the taper functioning as a back-stop against overdriving of the sections into the coupling used in such form of joint. The fact is that when, with such low wall thickness, an ample shoulder is left at the large end of the taper, the wall at the small end of the taper is so thin or reduced in substance that it is apt to crack or break under the severe stresses of driving the conduit section into the coupling. The present invention obviates or minimizes such danger, since the end portion 12 of a conduit section can be maintained at sufficient wall thickness to the very small end of its taper to remain intact during the driving operation.

I claim:—

1. A conduit installation comprising a pair of relatively thin-walled fiber conduit sections impregnated with waterproofing binder lending good machinability thereto and a coupling collar of similar material but of distinctly greater original wall thickness with which adjacent end portions of said conduit sections are in tight frictional engagement, the internal wall of said collar being machined to provide an inwardly projecting annular rib thereon and wall portions immediately beyond said rib each of progressively and slightly increasing internal diameter toward the end of said collar and the external wall of each conduit section being machined at its end portion to provide a tapered end portion of progressively and slightly decreasing external diameter corresponding to the progressively increasing internal diameter of a collar wall portion, said adjacent end portions of said conduit sections being forcibly driven into said collar wall portions and said peripheral rib serving to prevent either end portion from being overdriven.

2. A conduit installation comprising a pair of relatively thin-walled fiber conduit sections impregnated with waterproofing binder lending good machinability thereto and a coupling collar of similar material but of distinctly greater original wall thickness with which adjacent end portions of said conduit sections are in tight frictional engagement, the internal wall of said collar being machined to provide an inwardly projecting annular rib thereon and wall portions immediately beyond said rib each of progressively and slightly increasing internal diameter toward the end of said collar and the external wall of each conduit section being machined at its end portion to provide a tapered end portion of progressively and slightly decreasing external diameter corresponding to the progressively increasing internal diameter of a collar wall portion, said adjacent end portions of said conduit sections being forcibly driven into said collar wall portions and said peripheral rib serving to prevent either end portion from being overdriven and the surface of said rib lying at most no farther inwardly than to be substantially flush with the internal wall surfaces of said conduit sections.

HARRY SWEET.